United States Patent
Schmidt

(10) Patent No.: US 9,495,641 B2
(45) Date of Patent: Nov. 15, 2016

(54) SYSTEMS AND METHOD FOR DATA SET SUBMISSION, SEARCHING, AND RETRIEVAL

(71) Applicant: Nutonian, Inc., Boston, MA (US)

(72) Inventor: Michael Schmidt, Boston, MA (US)

(73) Assignee: Nutonian, Inc., Boston, MA (US)

( * ) Notice: Subject to any disclaimer, the term of this patent is extended or adjusted under 35 U.S.C. 154(b) by 171 days.

(21) Appl. No.: 14/016,287

(22) Filed: Sep. 3, 2013

(65) Prior Publication Data

US 2014/0074829 A1 Mar. 13, 2014

Related U.S. Application Data

(60) Provisional application No. 61/695,637, filed on Aug. 31, 2012, provisional application No. 61/695,660, filed on Aug. 31, 2012.

(51) Int. Cl.
*G06F 17/30* (2006.01)
*G06N 7/00* (2006.01)

(52) U.S. Cl.
CPC ............ *G06N 7/00* (2013.01); *G06F 17/3053* (2013.01); *G06F 17/30554* (2013.01)

(58) Field of Classification Search
USPC ................ 707/687, 723, 722, 736, 758, 781
See application file for complete search history.

(56) References Cited

U.S. PATENT DOCUMENTS

| | | | |
|---|---|---|---|
| 8,782,037 B1 * | 7/2014 | Barad | G06F 17/30864 707/723 |
| 2005/0183073 A1 | 8/2005 | Reynolds | |
| 2006/0190285 A1 * | 8/2006 | Harris | G06Q 30/02 705/1.1 |
| 2008/0307399 A1 | 12/2008 | Zhou | |
| 2010/0312718 A1 | 12/2010 | Rosenthal | |
| 2012/0144325 A1 * | 6/2012 | Mital | G06F 9/4446 715/763 |
| 2012/0192051 A1 | 7/2012 | Rothschiller et al. | |
| 2014/0074829 A1 * | 3/2014 | Schmidt | 707/723 |

(Continued)

OTHER PUBLICATIONS

Schmidt, Michael D. et al., "Automated refinement and inference of analytical models for metabolic networks," Aug. 10, 2011, Physical Biology, vol. 8, No. 5.

(Continued)

*Primary Examiner* — Sana Al Hashemi
(74) *Attorney, Agent, or Firm* — Wolf, Greenfield & Sacks, P.C.

(57) ABSTRACT

Systems and methods of searching for related data sets are provided. Multivariate data sets can be input as queries into a data set search engine. According to one embodiment, the input data set is automatically reduced to a set of best fit data models of minimum complexity that represent the data set. The data model is then compared to other data models to not only identify similarity between the models, but also to identify the particulars of why the data models are related. The search engine can be configured to return sets of data models as results from the search on the input data set. Results can be organized on data model type and/or information scores. Results can also be displayed graphically as a topographical map of nodes and edge. Each node can represent a data model and each edge can reflect the similarity between the nodes.

44 Claims, 12 Drawing Sheets

(56) References Cited

U.S. PATENT DOCUMENTS

2014/0172773 A1 6/2014 Schmidt
2014/0258189 A1 9/2014 Schmidt

OTHER PUBLICATIONS

Schmidt, Michael et al., "Distilling Free-Form Natural Laws from Experimental Data," Apr. 3, 2009, Science, vol. 324, No. 5923, pp. 81-85.
U.S. Appl. No. 14/016,300, filed Sep. 3. 2013, Schmidt.
U.S. Appl. No. 14/202,780, filed Sep. 3, 2014, Schmidt.
Barresse, Microsoft Excel 2013—Flash Fill. Microsoft Excel and Access Experts Blog. Jul. 28, 2012. retrieved from https://excelandaccess.wordpress.com/2012/07/28/excel-2013-flash-fill/ [Mar. 3, 2016 1:45:25 PM].
Ekart et al., A Metric for Genetic Programs and Fitness Sharing. Genetic Programming. Springer Berlin Heidelberg. EuroGP 2000, LNCS 1802. 2000. 259-70.
Mitra et al., Multi-objective evolutionary biclustering of gene expression data. Pattern Recognition. 2006;39(12):2464-77.
Vladislavleva et al., Order of Nonlinearity as a Complexity Measure for Models Generated by Symbolic Regression via Pareto Genetic Programming. IEEE Transactions on Evolutionary Computation. 2008;13(2):333-49.

\* cited by examiner

SYSTEMS AND METHOD FOR DATA SET SUBMISSION, SEARCHING, AND RETRIEVAL

RELATED APPLICATIONS

This application claims priority under 35 U.S.C. §119(e) to U.S. Provisional Application Ser. No. 61/695,637 entitled "SYSTEMS AND METHODS FOR DATA SET SUBMISSION, SEARCHING AND RETRIEVAL," filed on Aug. 31, 2012, and U.S. Provisional Application Ser. No. 61/695,660, "SYSTEMS AND METHODS FOR SYMBOLIC ANALYSIS BETWEEN DATA SETS," filed on Aug. 31, 2012, which applications are incorporated herein by reference in their entirety.

BACKGROUND

As the world becomes more digitized and computers become more integrated into daily life titanic data growth is occurring. Data researchers have long struggled to keep pace with data analysis and to extract meaningful information from this huge volume of data. Conventionally some data analysis techniques include "regression" operations that are performed to identify variables (inputs) in the data that are related to the changes in control variables (outputs). More traditional regression techniques express these relationships as mathematical models, and provide analysis of the quality and generality of the constructed models.

Classical regression techniques can efficiently optimize the parameters in assumed models (e.g., by using ordinary or generalized least squares method for the given model structure). However, classical regression techniques require a priori domain knowledge and/or human intuition for identifying the appropriate input variables and the appropriate form of the functional relationship between inputs and the output in order to do so.

Symbolic regression is a promising technique for analyzing and identifying relationships in complex and/or expansive data sets. Typically data sets being analyzed can include physically observable numerical data or data derivable from real world phenomenon. Complex systems yield correspondingly complex and expansive data sets. Symbolic regression provides one avenue on which to attempt to tackle analysis of such data sets. Symbolic regression can include a function discovery approach for analysis and modeling of numeric multivariate data sets. Insights about data and data generating systems can be determined by discovering a variety of symbolic expressions of functions that fit a given data set.

Symbolic regression, as opposed to classical regression techniques, enables discovery of both the form of the model and its parameters. Conventional implementations of symbolic regression systems proceed by asking a user to select a set of primitive functional operators allowed to generate mathematical models to evaluate data sets and then by applying learning algorithms to deriver model structures and model parameters. However, even symbolic regression analysis can require a user to specify what expressions to look for. The need for a human user can be a severe bottleneck even in symbolic regression settings.

SUMMARY

Various problems result from conventional approaches for analyzing data both in conventional regression techniques and in some symbolic regression techniques. By exploiting automated approaches for symbolic analysis unique opportunities for discovering relationships between data sets can be achieved.

According to one aspect, symbolic regression ("SR") systems and methods can implement automated analysis of an input data set to establish data models for an input data set. According to one embodiment, the data set models can then be used by an SR system as a representation of the input data set. The representation of the data set can then be analyzed to determine relationships and/or similarity of the input representation to other representations of data sets. For example, the SR system can implement a user interface that accepts data sets as inputs, generates representations of the input data set, and delivers related and/or similar data models and data sets responsive to search requests.

According to another aspect, SR systems and methods can automatically analyze any data set to reduce the data set to a representative data model. In some embodiments, the data model can include a set of equations that best describe the data set. According to one embodiment, the SR systems and methods can be configured to compare data models for one set against data models for other data sets to determine any relationship between the models, and hence relationships between the data sets represented. In some examples, the SR systems and methods compare each member of a set of equations against equations representing another data set to determine similarity scoring and/or relationships. In some embodiments, the SR system is configured not only to identify similarity and relationships but why the relationship exists between the data models.

Stated broadly, various aspects of the disclosure are directed to implementing symbolic regression systems and methods that automatically reduce data sets into representations of the data sets. The representations can be composed of fundamental building blocks (e.g., equations) discovered during automated symbolic regressions that describe the data sets. Through analysis of the sets of building blocks, relationships between data representations can be readily identified, even where the represented data is beyond traditional analysis (e.g., due to size, complexity, and/or inability of human operators to identify features on which to model the data). These relationships and/or similarity between data can be established for newly input data sets by search for similar data sets and/or data models. In some embodiments, similar and/or related data models can be returned as results presented in a user interface.

Organization of the results in the user interface can include emphasis on the elements (e.g., equations, variables, etc.) that generated the similarity and/or relationship between analyzed models and/or underlying data sets. In some extensions of the broad concepts, submitters of new data can be identified and referred to other users associated with the related data to foster co-operative analysis, even in areas that previously had no recognized connections.

According to one aspect, a computer-implemented method of receiving data sets as input for searching is provided. The method comprises accepting, in a user interface, an input data set having a plurality of data values associated with a plurality of variables, generating, by a computer system, a data model representing the input data set, and comparing, by the computer system, the data model to a plurality of data models, and determining, by the computer system, similarity between the data model and respective data models from the plurality of data models, and generating, by the computer system, a result set of similar data models from the determined similarities of the respective data models from the plurality of data models.

In one embodiment, the method further comprises organizing, by the computer system, the set of results based on an information score associated with each data model in the result set of similar data models. In one embodiment, the method further comprises organizing, by the computer system, the set of results into groups based on a type of data model associated with each data model in the result set of similar data models. In one embodiment, the method further comprises ranking the groups based on a best information score of a respective member of a respective group of data models.

In one embodiment, the method further comprises ranking within the groups based on an information score. In one embodiment, the method further comprises an act of displaying the set of results in a user interface of a host computer system. In one embodiment, the method further comprises generating a display of the set of results as a hierarchy of groups by data model type. In one embodiment, the act of generating the display includes ordering the display of the hierarchy of groups based on a best information score associated with respective members of the hierarchy of groups.

In one embodiment, the act of generating the display of the set of result includes ordering the display of data models within each group of the hierarchy based on a respective information score. In one embodiment, accepting, in the user interface, the input data set includes a cut and paste operation into a display text box. In one embodiment, accepting, in the user interface, the input data set includes specifying a location of a data set.

In one embodiment, the method further comprises an act of uploading the input data set from the specified location. In one embodiment, the method further comprises storing data models for subsequent comparison. In one embodiment, the method further comprises generating a topographical map of nodes and edges connecting pairs of nodes, wherein the nodes include the set of results. In one embodiment, each node in the topographical map represents a data model. In one embodiment, each edge in the topographical map represents a determined similarity between connected nodes. In one embodiment, the method further comprises accepting selection of at least one of a node and an edge to display additional information about at least one node.

According to one aspect, a user interface rendered on a display of the computer system in response to execution of instructions on at least one processor of the computer system is provided. The user interface comprises a search input element configured to accept submission of a multivariate data set as a query input, and a search result display configured to organize a set of results returned from similarity analysis of a data model representing the multivariate data set against a plurality of data models each data model representing a respective data set.

In one embodiment, the user interface further comprises a graphical display configured to render nodes and edges in a topographical map within the display, wherein each node represents a data model representing a respective multivariate data set and each edge represents a similarity scoring between two nodes. In one embodiment, the multivariate data set includes a plurality of numeric values associated with a plurality of variables. In one embodiment, at least some of the plurality of numeric values define the output of an equation including at least some of the plurality of variables.

According to one aspect, a user interface displayed on a computer system, wherein the user interface is rendered on a display of the computer system in response to execution of instructions on at least one processor of the computer system is provided. The user interface comprises a search input element configured to accept submission of a data model as a query input, wherein the data model includes a set of equations that represent a multivariate data set, and a search result display configured to organize a set of results returned from similarity analysis of the data model representing the multivariate data set against a plurality of data models each data model representing a respective data set.

According to one aspect, a system for searching a relationship between input data sets is provided. The system comprises at least one processor operatively connected to a memory, configured to execute a plurality of system components, a communication component configured to receive an input data set having a plurality of data values associated with a plurality of variables, a similarity component configured to compare a data model generated from the input data set to a plurality of data models generated from respective data sets and determine similarity between the data model and the plurality of the data models, and a result component configure to generate a result set of similar data models based on the determined similarities of the respective data models from the plurality of data models.

In one embodiment, the system further comprises a display component configured to organize the set of results based on an information score associated with each data model in the result set of similar data models. In one embodiment, the system further comprises a display component configured to organize the set of results into groups based on a type of data model associated with each data model in the result set of similar data models. In one embodiment, the system further comprises a display component configured to rank the groups based on a best information score of a respective member of a respective group of data models. In one embodiment, the display component is further configured to rank data models within the groups based on an information score.

In one embodiment, the system further comprises a display component configured to generate executable instruction for rendering the set of results in a user interface of a host computer system. In one embodiment, the display component is further configured to generate a display of the set of results as a hierarchy of groups by data model type. In one embodiment, the display component is further configured to order the display of the hierarchy of groups based on a best information score associated with respective members of the hierarchy of groups. In one embodiment, the display component is further configured to order the display of data models within each group of the hierarchy based on a respective information score.

In one embodiment, the communication is further configured to accept specification of a location of a data set. In one embodiment, the communication is further configured to upload the input data set from the specified location. In one embodiment, the system further comprises a display component configured to generate a topographical map of nodes and edges connecting pairs of nodes, wherein the nodes include the set of results. In one embodiment, each node in the topographical map represents a data model. In one embodiment, each edge in the topographical map represents a determined similarity between connected nodes. In one embodiment, the system is further configured to accepting selection of at least one; of a node, and an edge to display additional information about at least one node.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

As described above, determining symbolic relationships in existing datasets provides opportunities for analyzing data and identifying unique characteristics in existing datasets. Further, various embodiments of SR systems and methods enable searching using data sets as a search input. According to one embodiment, the user interface enables searching on input data sets and finding symbolic relationships in data sets without requiring the user to have any knowledge of what to look for. In some embodiments, a SR system automatically executes symbolic regression processes to fit expressions to input data. A group of identified expressions that satisfy conditions for accuracy and simplicity can define a model for the input data.

In one example, an SR engine can automatically execute co-evolutionary symbolic regression to define the data model for an input data set. The SR engine can parse other data models to identify similarity, relationships, and in some examples, the SR engine can be further configured to identify why the data models or data sets are similar or have a relationship.

According to another aspect, comparison data models can be generated by an SR system automatically. In one embodiment, an SR system can be configured to crawl publically available data sources (e.g., from the Internet). Once the SR system identifies a data set, the SR engine can execute symbolic regression operations to define and store data models for subsequent comparisons, for example, in database 108. Some SR systems can include an SR engine that executes on one or more computer systems to provide the functions discussed herein.

Figure 1:
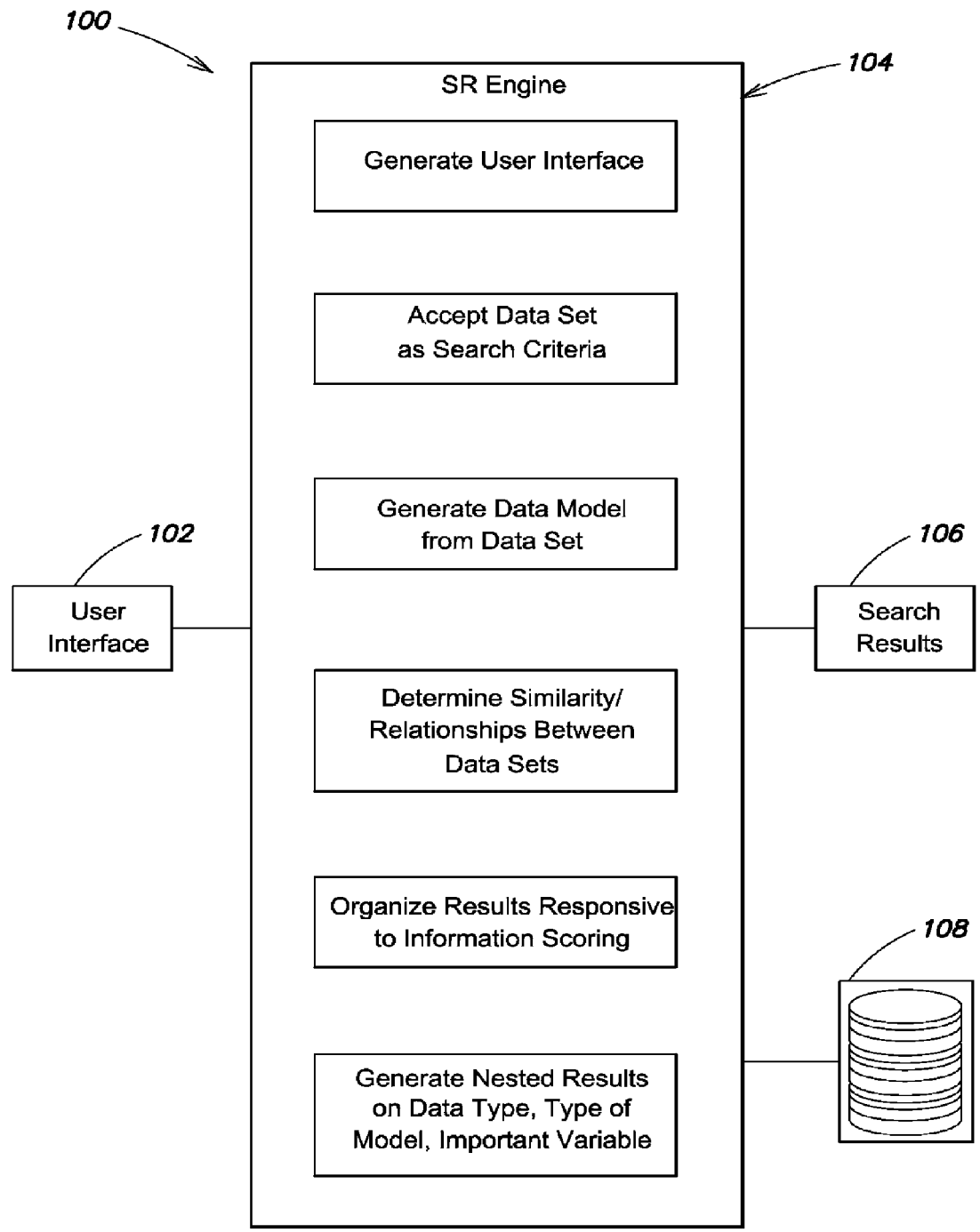
FIG. 1 is a diagram of an SR system for processing input data, according to one embodiment.

Shown in FIG. 1 is an example system 100 that includes an SR engine 104 for analyzing data sets using symbolic regression techniques. SR engine 104 can be configured to generate an interactive portal for displaying a search interface (e.g., 102). In one example, the SR engine 104 can be configured to generate computer executable code (including, for example, browser executable code) for rendering a user interface that accepts data sets as a search input. The SR engine 104 can be accessed over a computer network, including the Internet. For example, a user can access an online portal hosted by the SR system 100 executing an SR engine 104. Elements of an SR system 100 can be provided using a computer system such as the computer system 900 described with reference to FIG. 9.

In one embodiment, the user interface 102 can be rendered on a host computer system accessing the SR system 100 over a communication network. In one example, the SR engine 104 generates browser executable code for the host computer system accessing the SR system 100 via a web address. The user interface 102 is configured to accept user to input or upload of a data set as a search input for analysis by the SR engine. In some embodiments, the user interface 102 accepts a data set directly in the displayed user interface. For example, a cut and paste operation can be employed to enter a data set into a search box displayed in the user interface. The search box of the user interface can accept, for example, text data, tabular data, .csv, .xls, etc. In other examples, the user interface 102 can also be configured to accept uploaded files containing data sets, and in others, to allow a user to import data sets from designated locations (e.g., local file, cloud storage, web-site, etc.) entered into the user interface 102.

In some embodiments, the user interface can also be configured to accept advanced specification of search criteria. The advanced specification of search criteria can be used by an SR engine to tailor similarity and/or relationship analysis. In one embodiment, advanced specifications can include any one or more of: specific portions of an input data set to emphasize in determining relationships/similarity, equations to use and/or emphasize in analyzing the data set, variables to emphasize, weightings to apply to data, variables, and/or equations, among other examples.

In some embodiments, data models and/or the equations within the data model are evaluated on accuracy and complexity to determine an information score for the equations and/or data model. In one example, a data model can be defined by an SR system based on a Pareto Frontier of accuracy and complexity (discussed in greater detail below). Advanced criteria input into a user interface can also include specification of preference towards data models/equations that are more accurate, less complex, and/or better balanced between accuracy and complexity (in essence shifting the frontier used to identify the best equations for the model). The advanced criteria specified in the user interface can be selected to impact determination of a data model and/or selected to impact the identification of similar/related data models. By modifying the scoring of data model similarity the end user can be allowed to specifically tailor the result set of data models and the identification of what or why they are similar.

As discussed above, the SR engine 104 can be configured to accept data sets input into a user interface. According to some embodiments, the SR engine analyzes any input data to identify variables, values, related values, so as to format the data for analysis. In some settings, the user interface can include recommendations on formatting an input data set. In one example, columns of data are formatted as data values associated with one variable and additional columns of data are assigned to additional variables, as needed. Comma separated values are processed by the SR engine similarly, where each comma separated position in a line of data is assigned to one variable for any such lines of data. Native formatted data can likewise be evaluated, and if available, variable names can be used to partition data sets. As discussed in greater detail below, the actual variable names can, in some examples, be ignored in determining similarity and/or relationships. In some further embodiments, the presence of variables can be used to define properties of equations, and the properties of the equations used to determine similarity.

In some embodiments, the SR engine 104 is configured to generate data models from any input data. The generated data model (e.g., list of equations fitting the data) can be displayed in the user interface as part of a set of results (e.g., search results 106). The user interface can further be configured to display each of the equations in the model ranked on accuracy and complexity. The SR engine can be configured to compare the generated model to any existing data models to generate a set of related data models as a set of results for a search interface.

In one embodiment, a plurality of data models can be stored on the SR system, for example, on database 108. In other embodiments, existing data models can be stored in network accessible locations, including, for example, cloud storage, SANs, or databases located on connected computer systems.

Once related and/or similar data models have been identified, the user interface can be configured to rank the set of related and/or similar models for presentation in the interface. According to some embodiments, the user interface is configured to display the best solutions from multiple different ways of modeling the data (e.g. models of variable x, models of variable y, and models of variable z) simultaneously. However, as the model types for each variable can be different, the user interface can be configured to interleave the solutions for each model type identified.

According to one embodiment, the SR engine is configured to organize the result within the user interface by ranking each model type by the best information score (e.g., a scoring of accuracy and/or complexity) that the model achieved, and then by ranking each solution with each model type by a respective information score. The information scores are generated so that models that are simultaneously accurate and simple are effectively displayed at the top of a set of results in the user interface.

The SR engine can also be configured to generation graphical visualizations of the relationships between data models. In one embodiment, topographical mappings of related data sets can be generated and displayed in the user interface. In some examples, the user interface displays a navigable topographical map (e.g., FIG. 8, discussed in greater detail below). The topographical map display can be rendered in an interactive user interface that accepts user selections. In response to selections within the map, the SR engine enables a user to traverse relationships between data model/sets, for example, displayed as edges in the map. Transitions between data models/sets can cause the SR engine to re-render the topographical map based on the newly selected data model/set. Further detail can also be provided on the selected model/data set and/or the relationship selected. The additional information can be displayed in the user interface to further evaluation of any connected model or data set. Identifying connections between data models and sets can provide insight into the input data set being analyzed.

According to some embodiments, further details can be provided on the related data sets identified as results in the user interface. For example, the origin information of a related data model or data set can be displayed in the user interface by selecting a connected node. The origin information can include any one or more of information on a previous submitter who uploaded their data for analysis, a public web address for a data set source, and contact information for a researcher associated with a data set source, among other examples. By providing data origin information, an SR system and the user interface displays can facilitate interaction between various disciplines and/or researchers having related data.

Figure 2:
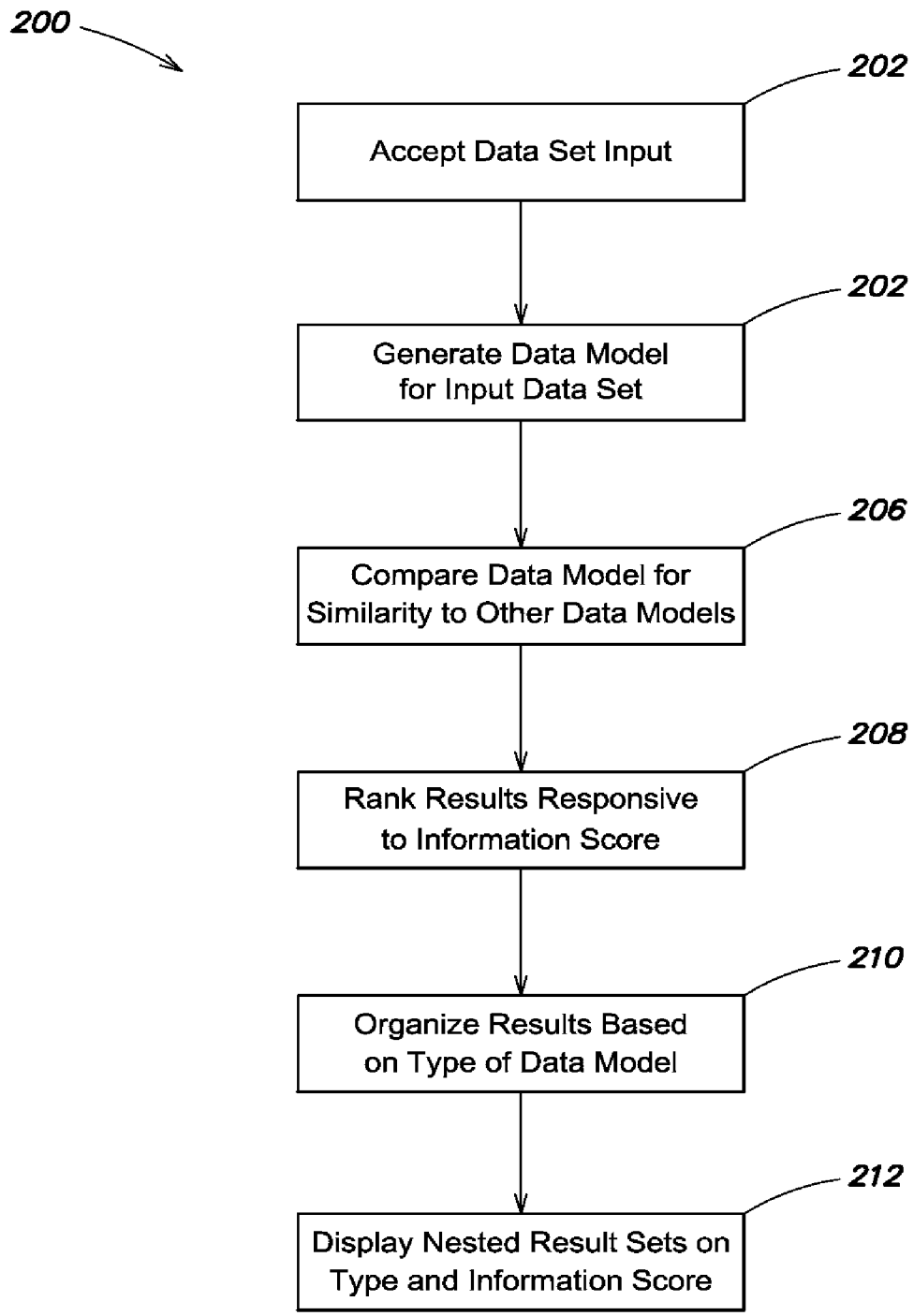
FIG. 2 is an example process flow for generating a user interface, according to one embodiment.

Various aspects of an SR system can generate, organize, and display user interfaces within a web site over the Internet or through other communication networks connected to the SR system, wherein the user interface display can enable searching for related and/or similar data sets based on a data set input. Shown in FIG. 2 is an example process 200 that can be executed, for example, by an SR system or SR engine for generating a user interface which is configured to display a set of data model results.

Process 200 begins at 202, with accepting a data set as input. According to some embodiments, accepting the data set as an input can include displaying a text input box in a computer generated user interface. The computer generated interface can specify criteria for inputting a particular data set. For example, the user interface can include text description of how to enter data.

Figure 3:
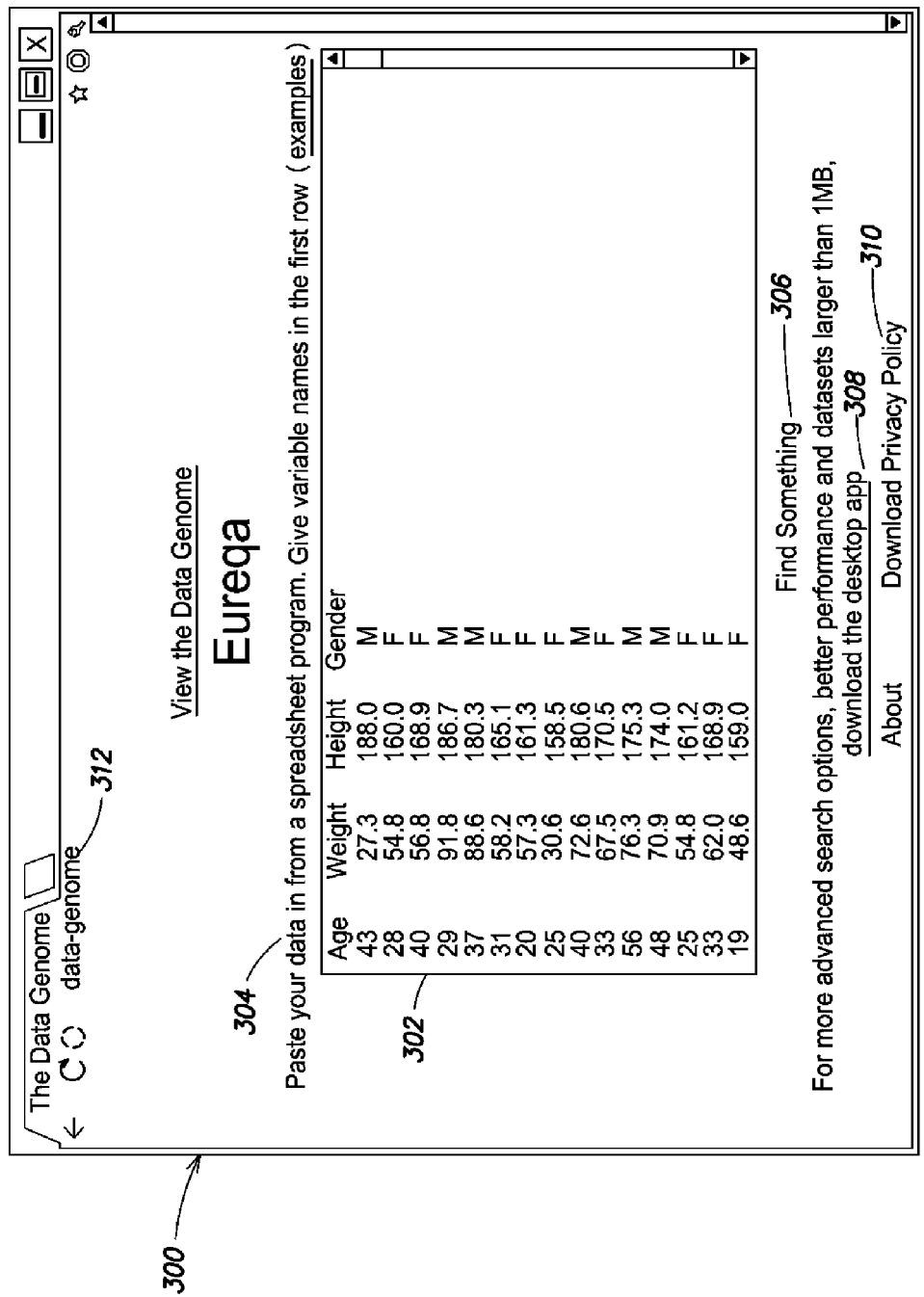
FIG. 3 is an example user interface for inputting data set as a searchable object, according to one embodiment.

FIG. 3 illustrates an example user interface display 300, which includes a text box 302 for entering a numerical data set including a plurality of data variables. As indicated in the example interface at 304, the system requests that the user assign variable names to each variable represented in the input data set. In other embodiments, data sets can be input in columns without requiring variable names, which can be assigned by the system upon input. Once a data set has been input (e.g., in box 302) the system can begin analysis and generation of a set of data models or data sets related to the input responsive to selection of a search executable, e.g., at 306, titled "find something."

In other embodiments, other titles for executing a search are used including "search," "go," "execute," "submit," etc. Additional search options can be displayed in the user interface 300 to further specify search criteria. In the example interface 300, at 308 the user interface indicates that additional search options require different versions of the executing software. For example, a desktop version can include additional features not provided in interface 300, although in other embodiments, a user interface can include a selection for specifying advanced search options (for example at 308). In one example, the user interface can be configured to accept advanced specifications in the first displayed window. Selection of advanced causes the system to visualize advanced options upon selection of a display element in the user interface. In one alternative, selection of a display element associated with advanced options causes the user interface to display a new advance search options screen configured to accept advanced search criteria for tailoring the search for related data model or data sets.

In some embodiments, additional information can be provided on the host of a web page providing the user interface. In other embodiments, additional information can be provided on the executable program in the user interface (e.g., at 310). The additional information made available in the user interface can include links to a privacy policy (e.g., at 310). The privacy policy can specify how nay data enter can be used or not used depending on the particular policy.

Returning to FIG. 2, process 200 continues at 204 with generation of a data model from the input data of 202. Various symbolic regression processes can be executed as part of 204, including, for example, co-evolutionary symbolic regression. According to one embodiment, at 204, representations of the input data set are generated where the representations can include data model including a set of equations that best fit the input data. Best fit can be determined, for example, by a system, configured to calculate a Symbolic Pareto Front of a set of expressions that best describe the data.

The Symbolic Pareto Front (SPF) is the set of mathematical expressions that describe the dataset at increasing accuracy and complexity levels taken from a broader set of mathematical equations that describe the data, but to a lesser degree of one or more of accuracy and simplicity. The SPF is the set of mathematical expressions that satisfy the criteria: for each equation in the SPF there is no other equation which improves over the SPF equation's level of accuracy at the same degree of complexity or there is no equation in the broader set that improves over the SPF equation's degree of complexity at the same degree of accuracy.

Figure 4A:
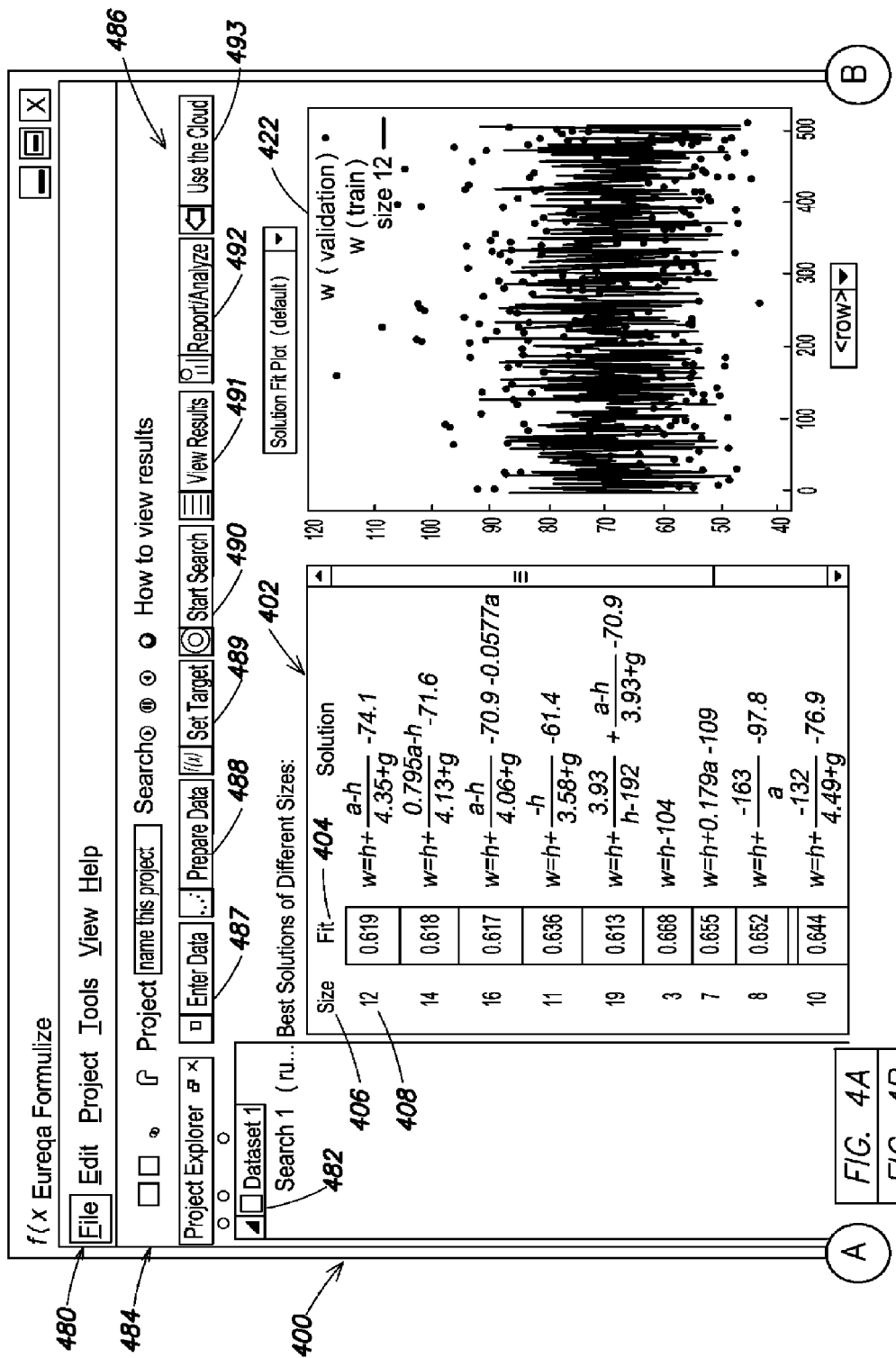
FIG. 4A and FIG. 4B illustrate an example user interface, according to one embodiment.
Figure 4B:
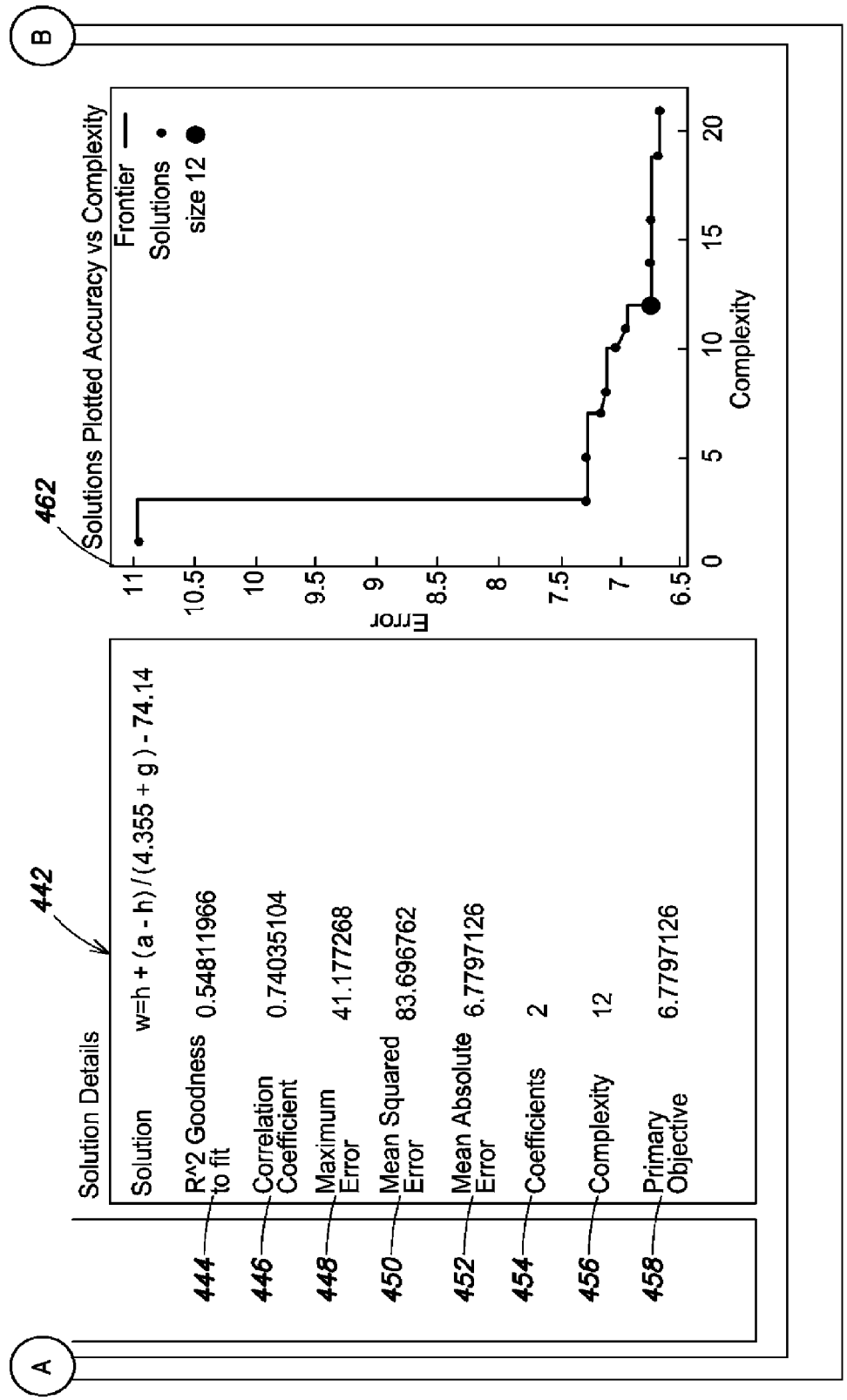

Shown in FIG. 4 at 462, is an example graphical display of a SPF defining the set of equations that best represent a data input. In 462, the area displayed under the SPF is associated with equations that are not as accurate or are more complex than the equations plotted. In one embodiment, example user interface 400 can be presented during execution of process 200. In one example, user interface 400 can be displayed once a data model or representation of the input data set is generated at 204. User interface 400 can include a display of the set of equations that best fit the input data, e.g., 402. A metric for quantifying the degree each equation fits the input data can be displayed, e.g., at column 404, titled "fit." Each equation can also include information quantifying the complexity of the associated equation—sometimes referred to as the size of the equation (e.g., column 406). Each equation can be tested for fit, based on training functions and validation functions executed against sets of the input data, to determine how well a given equation fits the data.

In one example, a solution fit plot can be displayed in user interface 400 at 422 showing validation data points, training data points, and data size corresponding to an identified equation (e.g., equation of size 12 at 408). Each equation can be analyzed to determine a plurality of metrics that contribute to a "fit" score. Shown at 442 is a plurality of evaluation metrics applied by an SR system to determine how well an equation fits the input data. Example metrics include "r squared" goodness of fit at 444 (the proportion of variability in a data set that is accounted for by the statistical model); correlation coefficient at 446 (a quantity that gives the quality of a least squares fitting to the original data); maximum error at 448; mean squared error at 450; mean absolute error at 452; coefficients in the equation at 454; complexity of the equation at 456; and primary objective at 458 which is a configurable metric that the algorithm optimizes (such as one of the above metrics chosen by the user); among other examples. In some implementations, user interface 400 is displayed in conjunction with an enhanced feature version of the SR system.

In particular, one embodiment of an enhanced feature version of the SR system is implemented as a locally executing program which can be installed on a client computer system. An end user can, for example, download an executable program, which can include functions for importing and/or inputting data sets for analysis (e.g., at 482 an input data set "dataset 1" is displayed). Data sets can be opened through options displayed in a menu bar, e.g., 480 (file, edit, project, tools view, and help, among other examples). At 484, new data can be input, imported, and/or added. Other options displayed at 484 include cut and paste, project naming, and search features. In some embodiments, additional tools can be displayed with visual indicators of their associated function in bar 486: enter data 487; prepare data 488 (which can format data for analysis); set target 489 (which enables the user to specify functions to favor during searching); start search 490; view results 491; report analyze 492; and use the cloud 493, among other options. In various embodiments, the locally executable program can be configured to provide all of the functions discussed herein with respect to an SR system and/or SR engine.

In one embodiment, a repository of analyzed data sets and/or data models is made available through central server. The central server can be connected to the Internet for remote access. "Use the cloud" 493 can be configured to toggle on and off access to the repository of data models and/or data sets. When the feature is on, the locally executable program can be configured to access the central server and its repository of data models. The repository can thus be used by the locally executed program to make comparison to the repository's data models. When the feature is off search operations for similar data sets (e.g., selection of start search at 490) can be configured to use locally accessible data models for analysis and/or comparisons to identify relationships. In some implementations, users can define what sources are included in locally accessible data sources (e.g., local database, local network computers, trusted systems, corporate systems, laboratory systems, WAN or LAN segment, systems within a firewall, etc.).

In some embodiments, user interface 400 has been described with respect to a locally executable program, however, in other embodiments, the features and functions of user interface 400 can be provided as a hosted program. The hosted program can be accessible over any communication network (e.g., WAN, LAN, MAN, mobile, cellular, etc.) and can be configured to deliver search results in, for example, a browser executing on a host computer system. In some embodiments, the host program can include account information for users, allowing for access customized on a user account basis. Each user account can specify, for example, permitted data sources to use during search operations. Further, in some implementations, a user account can include specification of contact information, and whether other searches can be informed of the contact information if an input data set generates a match.

Figure 5A:
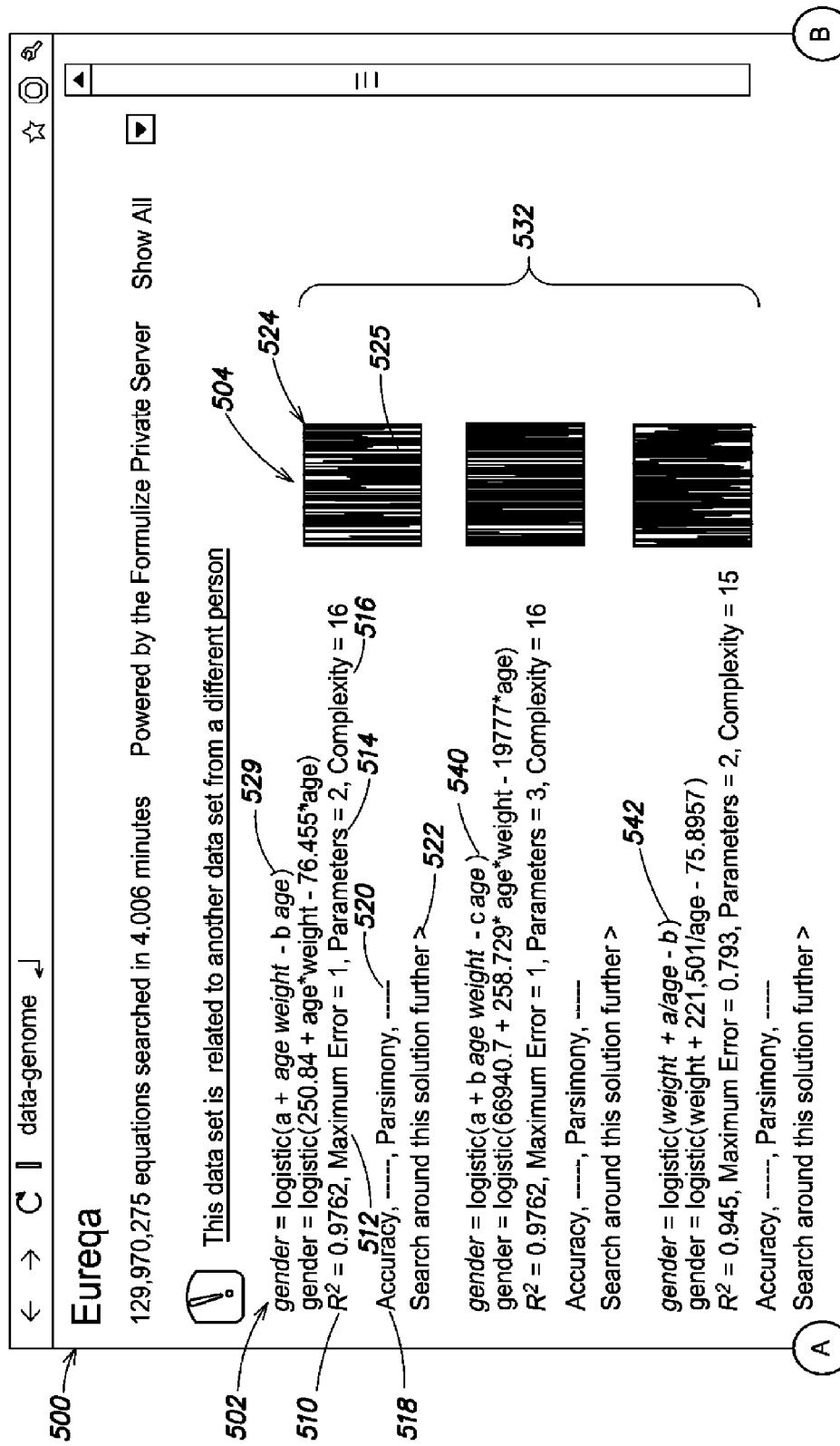
FIG. 5A and FIG. 5B illustrate an example user interface displaying a data model for an input data set, according to one embodiment
Figure 5B:
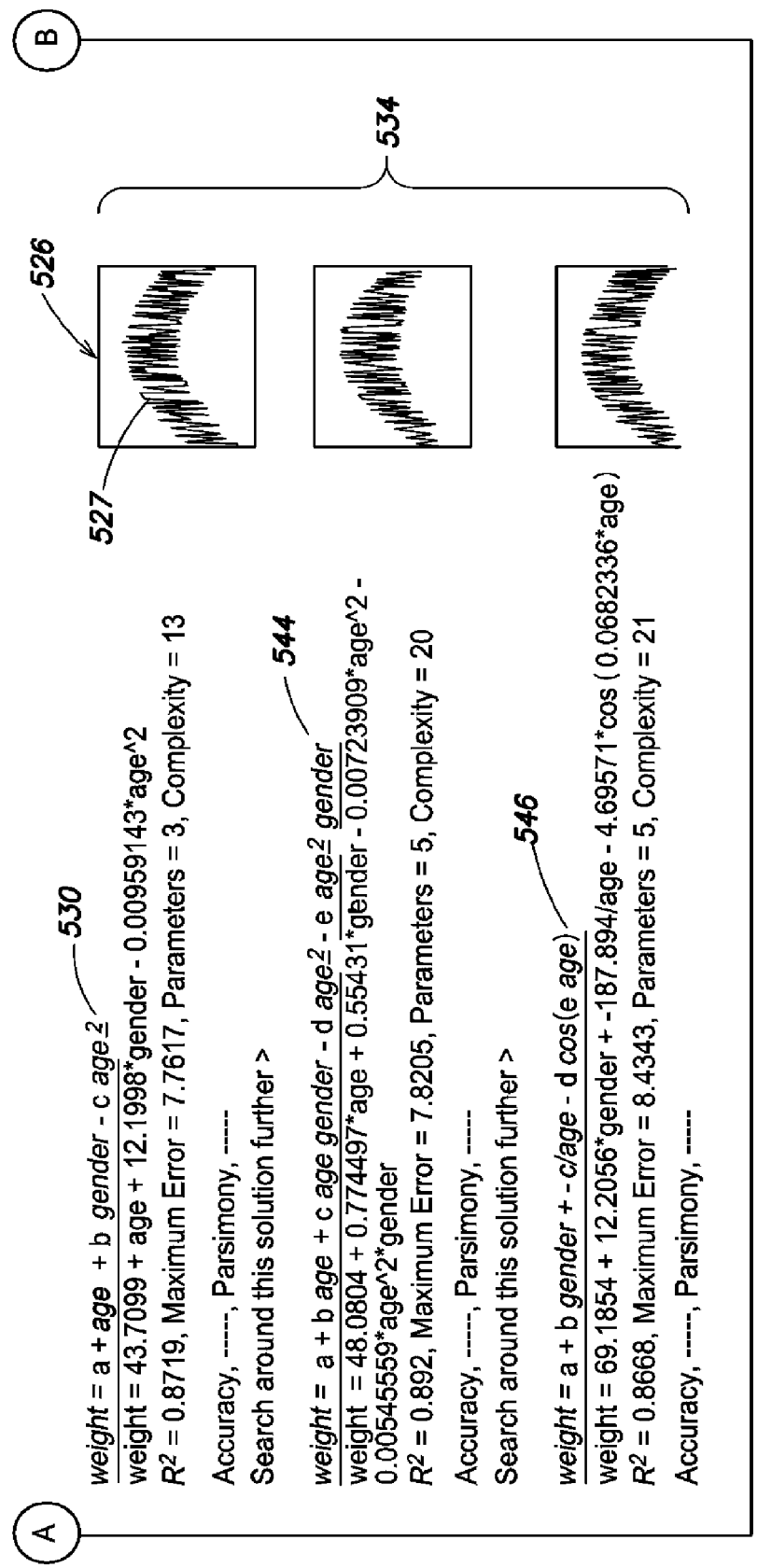

Shown in FIG. 5, is another example of a user interface 500 for displaying a resulting data model from an input data set, which in some examples can be generated and displayed during execution of process 200, FIG. 2, at 204. User interface 500 can be configured to display the set of equations that make up the best fit data model for an input data set. Each element of the set of equations forms the "genome" of the input data. The set of equations can be understood as akin to multiple "genes," wherein each of the genes is a single expression that together encodes a system, or the data set. According to one embodiment, variable names within the data set are replaced with generic variables during model generation (e.g., at 204). Variables names can be replaced with x, y, and z, and other generic characters or values as is necessary.

The results can be seen in one example at column 502, where the best fit equations within the data model can be displayed in order of degree of fit. The parameters used to determine best fit can be displayed in conjunction with each equation: r squared at 510; maximum error at 512; number of parameters in the equation at 514; and complexity at 516, among other examples. According to one embodiment, the metrics used to evaluate each equation can be summarized as an accuracy and parsimony score (degree of complexity). At 518 and 520, respectively, the accuracy and parsimony scores are shown on a star rating scale. In other embodiments, different scales can be used. In some further embodiments, a numeric value can be displayed instead of a rating.

At 522, the user interface is configured to accept user input for "search around this solution further." According to one embodiment, any expressions entered into this option are used to initialize the algorithm's starting population of candidate models. The initial population will then consist of variations of these expressions and their sub-expressions— such as the full expression, the full expression, or a sub-expression with parameters randomized. In effect, the algorithm is heavily biased to reuse and refine these expressions in order to better fit the data. If the expressions entered were useful, this can greatly reduce the computational effort necessary to find an accurate model since the algorithm will not need to infer its form from entirely scratch. By selecting search around this solution further, the system enables a user to refine search criteria for similar data sets, and constrains the search to results that have a relationship and/or have similarity based on the specified equation.

Additionally each equation in the display set can include a visual representation of the properties of the identified equation. For example in column 504, a graphical representation of the behavior of the identified equation can be displayed for each associated equation. In some examples, the graphical representation (e.g., 524) can include a graph of the properties of the equation (e.g., 529) and a display of data points (e.g., 525) fitted to that particular equation. At 526 shown is another graphical representation including a graph of the properties of a respective equation (e.g., 530) and a display of data points (e.g., 527) fitted to that particular equation. According to some embodiments, user interface 500 can be configured to display groups of results, where the grouping of data model/equations can be based on a common dependent variable. For example, group 532 includes the equations describing the properties of gender in the data set (e.g., 529, 540, and 542) and group 534 includes the equations describing the properties of weight in the data set (e.g., 530, 544, and 546).

Returning again to FIG. 2, process 200, continues at 206 with determining similar data sets using the model generated at 204. In some embodiments, a distance metric can be calculated between the data model from 204, and other data models. In various embodiments, the distance metric can be calculated between two data models using a number of techniques, including any one or more of: determining an edit difference between two data models or genomes (the data models can be compared for edit distance using different orderings of the equations representing the searched on model and a comparison model); comparing the structure of the expression trees generated from the equations in a pair of data models (input model and a comparison model); determining co-compression distance, which provides a measure/estimate of the ratio of individual and combined information content; identifying common sub-expressions within sets of equations, which can ignore variable names and/or coefficients (e.g., some embodiments only compare structure of sub-expressions to generate a distance metric between equations in data models); and determine a cross regression distance by generated data from the equations of a first data model and measure the accuracy of a second data models to describe the generated data, in some examples, using all variable permutations for the data model.

Various methodologies for generating similarity metrics, for example, based on distance between data models are discussed in greater detail in co-pending U.S. application "SYSTEMS AND METHODS FOR SYMBOLIC ANALYSIS BETWEEN DATA SETS" filed on Sep. 3, 2013, which claims priority to U.S. Provisional Application Ser. No. 61/695,660, "SYSTEMS AND METHODS FOR SYMBOLIC ANALYSIS BETWEEN DATA SETS," filed on Aug. 31, 2012, which applications are incorporated herein by reference in its entirety.

According to one embodiment, an SR system executing process 200 can use co-compression distance between two data models to determine a rough metric for their similarity at 206. Co-compression metrics can be less computationally expensive than other distance evaluations; however, co-compression does not provide insight into why two data models are similar. Thus, the SR system can use co-compression metrics as a course filter to determine which data models to evaluate under more computationally expensive processes. In one example, co-compression can be used as a course filter to eliminate data models that are not similar, and the remaining data models that pass through the course filter can be evaluated pair-wise based on, for example, a comparison of the structure of the expression trees generated from each of the equations in the pair of data models being evaluated (e.g., at 206). According to one embodiment, the benefits of structural analysis of expression trees can include identification of why and/or how two data models are related to each other. Thus, a distance score between models can be generated and a reason for the similarity can also be defined by the SR system (e.g., at 206).

Once similar data models have been identified process 200 continues at 208 with organization of the results for display. For example, at 208 the set of results can be ranked for display based on an information score associated with each model. In some embodiments, known information scoring processes can be used. In one example, Akaike Information Criterion (AIC) provides a scoring metric that can be used to evaluate and rank data models. According to some embodiments, AIC scoring can only be used to evaluate data models of the same type, which can be identified by having the same dependent variable. At 210, the data models returned from 206 can be organized based on type and within each data model type AIC scores can be used to rank results.

Process 200 is illustrated by way of example with ranking (e.g., 208) preceding grouping (e.g., 210). In other embodiments, steps 208 and 210 can be executed together, simultaneously, or in different order to achieve a set of data model results that are organized first by data model type and ranked within each type based on an information score. According to some embodiments, ranking results at 208 can also include ranking of data model types. In one example, for each data model type, the best information score for a model of that type is identified. The data model types can then be ranked with respect to the best information score contained within each type.

Ranking each data model type first by a best performer score and also within each data model to reflect the best models in each type, enables the SR system to convey a large amount of information across a plurality of data relationship while optimizing the efficiency of the data display. In one embodiment, the result is a nested hierarchy of data model results, which can be displayed in a user interface at 212. In some embodiments, the results displayed in the user interface can be optimized to a page view typical of web based browsers and/or desktop applications. For the first page of results display, a predetermined number of groups of data model types can be presented.

Each data model type group can likewise have a first page display threshold for a number of data models within each grouping. In some embodiments, each of the nested groupings of data model types can include options for displaying additional results within the group. Responsive to selection, the user interface can display all the results for a given group. In one example, the additional results can be displayed ranked on information score. In another example, the user interface can be further configured to allow selection of specific elements of the displayed data models, and the results can be re-ordered based on any such selection in the user interface.

Figure 6:
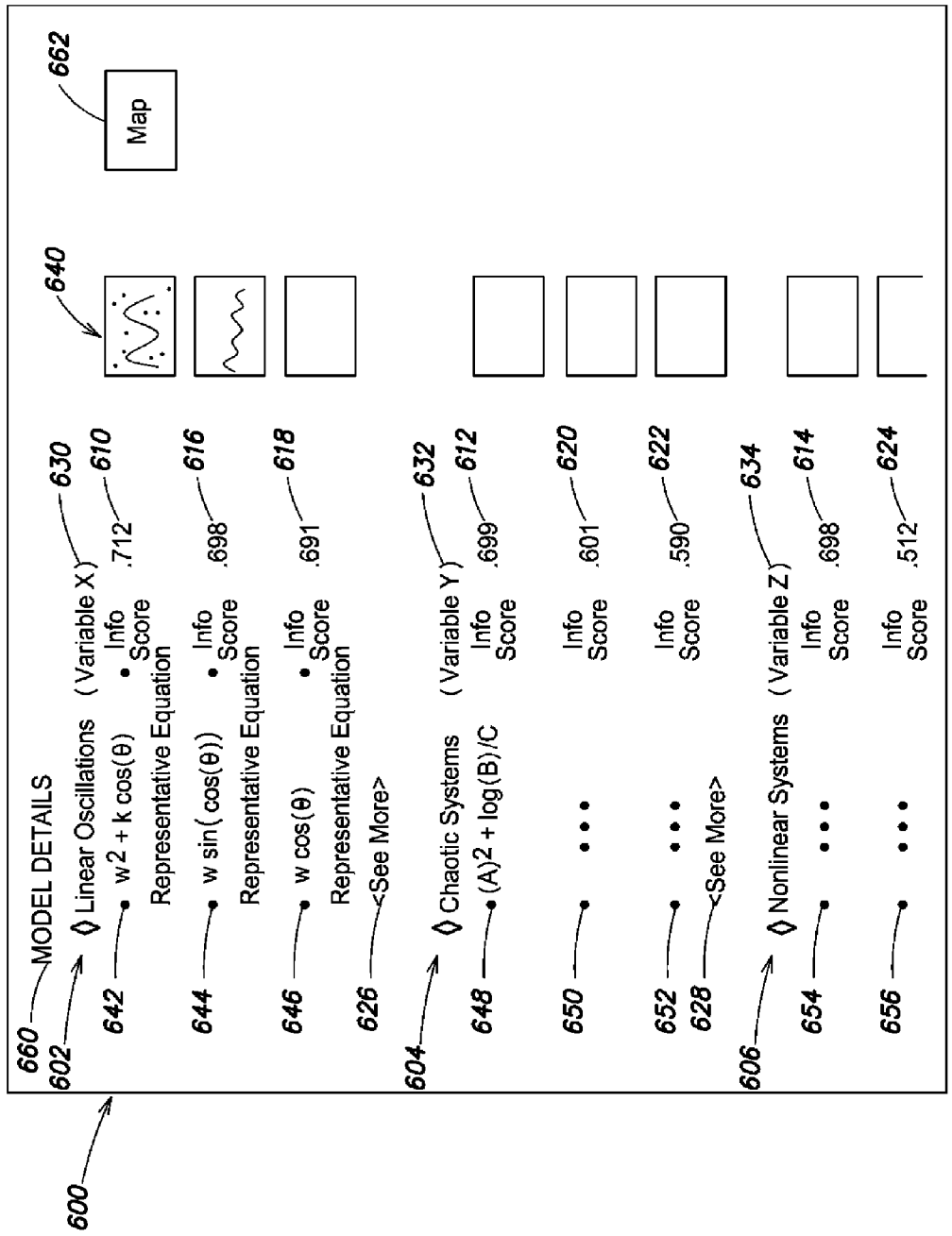
FIG. 6 is an example user interface for displaying result sets of data models, according to one embodiment.

FIG. 6 illustrates an example user interface 600 displaying a nested hierarchy of data set/model results. Evaluations of the information score of the related and/or similar data model, results in an organization of data types 602, 604, and 606 being shown on the first page of data model results. The data types can be labeled for each group Linear Oscillator 602, Chaotic Systems 604, and Nonlinear Systems 606. Additionally, information can be provided on which variable(s) from the input set bear the relationship to the displayed type of data model (e.g., 630-634).

As discussed, data types can be ranked based on a best performer information score within each data type (e.g., 610, 612, and 614). Data models can be further ranked within each data type based on individual information score associated with each model (e.g., 616, 618, 620, 622, and 624). As shown in FIG. 6, the user interface can include an executable display for causing the system to display additional data model results within each data type (e.g., 626 and 628). In response to selection, the system can display additional result for each group. In other embodiments, the system can open a new window for displaying additional matching models within each group, among other options.

According to some embodiments, user interface 600 can also include visual descriptions of the data model search results. In column 640, for example, the data model and/or a representative equation can be graphically displayed next to each respective data model. In some embodiments, a representative equation for each data model is displayed (e.g., 642-656). A corresponding graph of the behavior of the representative equation can be displayed for each equation at column 640. Each graph in column 640 can also include an illustration of the data points of the input data set that best fit the equation and/or model. For example, the graph displayed at column 640 can reflect the behavior of the data model being represented, with data points from the input data model illustrated against the behavior of the similar data model result.

According to some embodiments, user interface 600 can provide a detail view of model results. A title display can indicate to a viewer that a detail view is being displayed by the SR system in user interface 600. For example, at 660 "Model Details" indicated that the displayed screen is presenting detail associated with a set of search results obtained by the SR system in response to the input of a data set. In some embodiments, user interface can include selection for navigating to other views of the search results. For example, at 662 a user interface element labeled "MAP" can be selected. In response to selection of MAP at 662, the system can be configured to transition to a topographical map of the generated data model results, which can be displayed in another user interface screen. Embodiments of the topographical map are discussed in greater detail below (e.g., FIG. 8, user interface 800).

As discussed, data model results can be ranked on an associated information score determined for each model. In some embodiments, specialized information scores can be generated to provide more accurate assessments of information scoring, accuracy of data models, complexity of a data model, and/or error ratings for data models. In some embodiments, at 208, the information scoring used to evaluate data model results can include an AIC score, but rather than conventional AIC which employs a squared-error and the number of free parameters (coefficients) of a model, the information score used in various embodiments can be determined from squared error with a linear combination of a number of a number of coefficients and a new complexity metric (in one example, the number of coefficients is combined with the new complexity metric to incorporate 50% of each value—although in other embodiments different weights can be given to participation of number of coefficients and the new complexity metric.

According to one embodiment, an SR system can be configured to calculate a new complexity metric from a binary parse tree representation of an equation. One approach is to define complexity as the number of nodes (e.g. number of operations and leaves) in the generated parse tree. In another embodiment, the binary parse tree can first be normalized. Normalization of the parse tree can include any one or more of: expanding factored terms, performing symbolic simplifications, sorting terms by size, sorting factors by size, reducing rational terms, etc.

The system can then be configured to assign specific complexity values for each operation type—for example, an add operation is 1, while a cos(x) operation is 3; exponentiation is assigned another complexity value, etc. By default, the values for each operation type are defined relative to the operations of addition and multiplication, as the equivalent complexity of the first two terms in the series expansions of that function, assuming fixed values for add and multiply. In the example, cos(x) has a series expansion of 1+−1*x*x+ . . . Using fixed values of add and multiply of 1, the series expansion has the complexity of 3 since there is 1 addition and 2 multiplications in the first 2 terms. Once each operation has been assigned a complexity value, the sum of all the complexities is calculated to derive the new complexity metric for a given equation. In some implementations, the SR system can be user configurable as to the complexity value assigned to each equation. In one example, the SR system can display a user interface that presents default complexity values for a set of operations (e.g., sometimes filtered on operations appearing in the data set being analyzed) and enables the user to input their own values for complexity of each operation.

In an alternative embodiment, instead of a tree based representation an acyclic graph representation can be used. As before, the system can then be configured to assign specific complexity values for each operation type, now with in the acyclic graph Once each operation has been assigned a complexity value, the sum of all the complexities is calculated to derive the new complexity metric for a given equation. According to some embodiments using the acyclic representations, the system can be configured to count repeated sub-expressions only one time, yield in some implementations a better representation of complexity.

Employing a combination of number of coefficients and the new complexity metric discussed can yield better information on complexity. In particular, nonlinear expressions can have effective degrees of freedom, even without free parameters. Thus, is some embodiments, the SR system can be configured to account for degrees of freedom in nonlinear data model, yielding better determinations of information score.

In other embodiments, the SR can also be configured to combines linear correlation with absolute error in order to generate an error metric for evaluating equations and/or data models. Conceptually, the SR system can be configured to determine an error metric that is more suitable for random expressions with very high error. In one embodiment, the system calculates a correlation coefficient if the data model is bad and a direct error metric when the data model is good. To do this, the system can be configured to combine correlation and absolute error linearly and use the correlation value to interpolate between the two metrics. In one example, the SR system is configured to calculate a hybrid error metric that is constrained to be monotonic. According to one embodiment, the hybrid correlation coefficient metric is defined as "$(1-r^2)*a+\min(a, err)$", where "r" is the Pearson correlation coefficient, "a" is a fixed constant (e.g., a=2 in one implementation), and "err" is a mean error metric (the mean absolute error in our implementation), normalized by the standard deviation of the dependent variable.

Figure 7A:
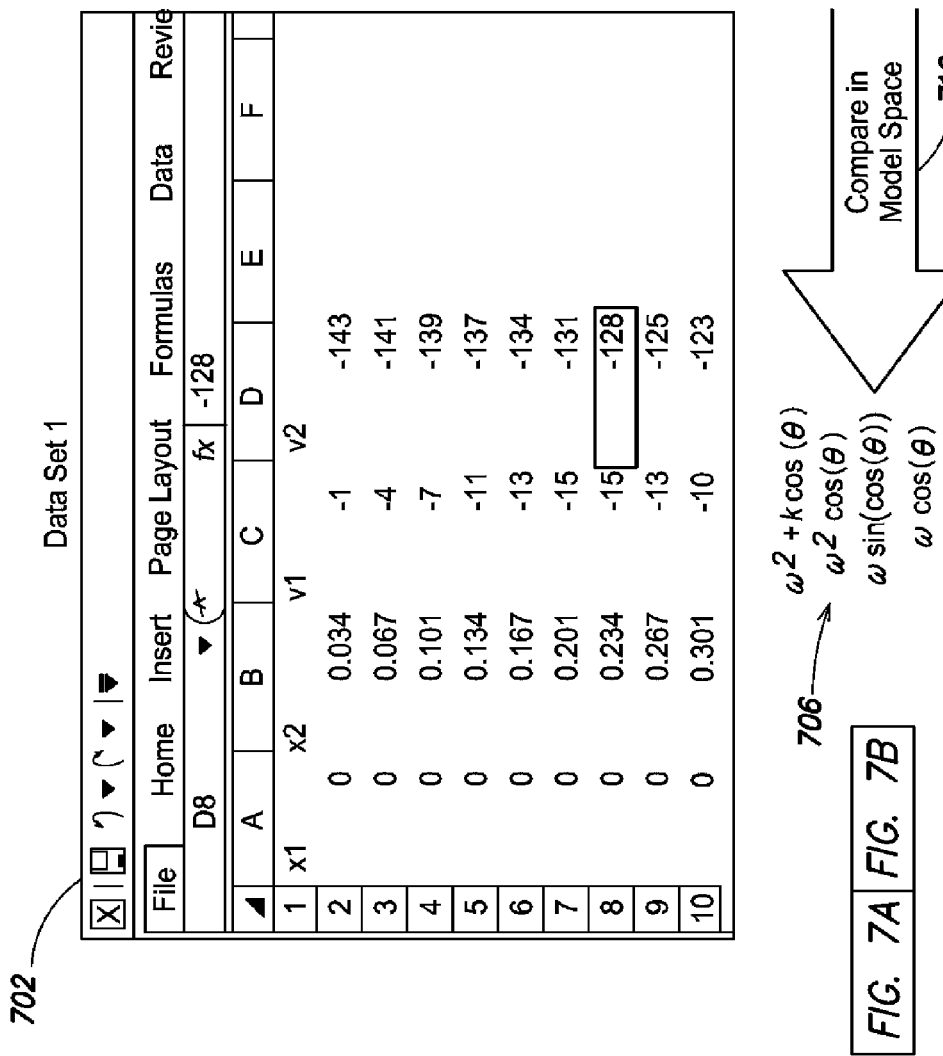
FIG. 7A and FIG. 7B illustrate a conceptual model of the data analysis performed according to one embodiment.
Figure 7B:
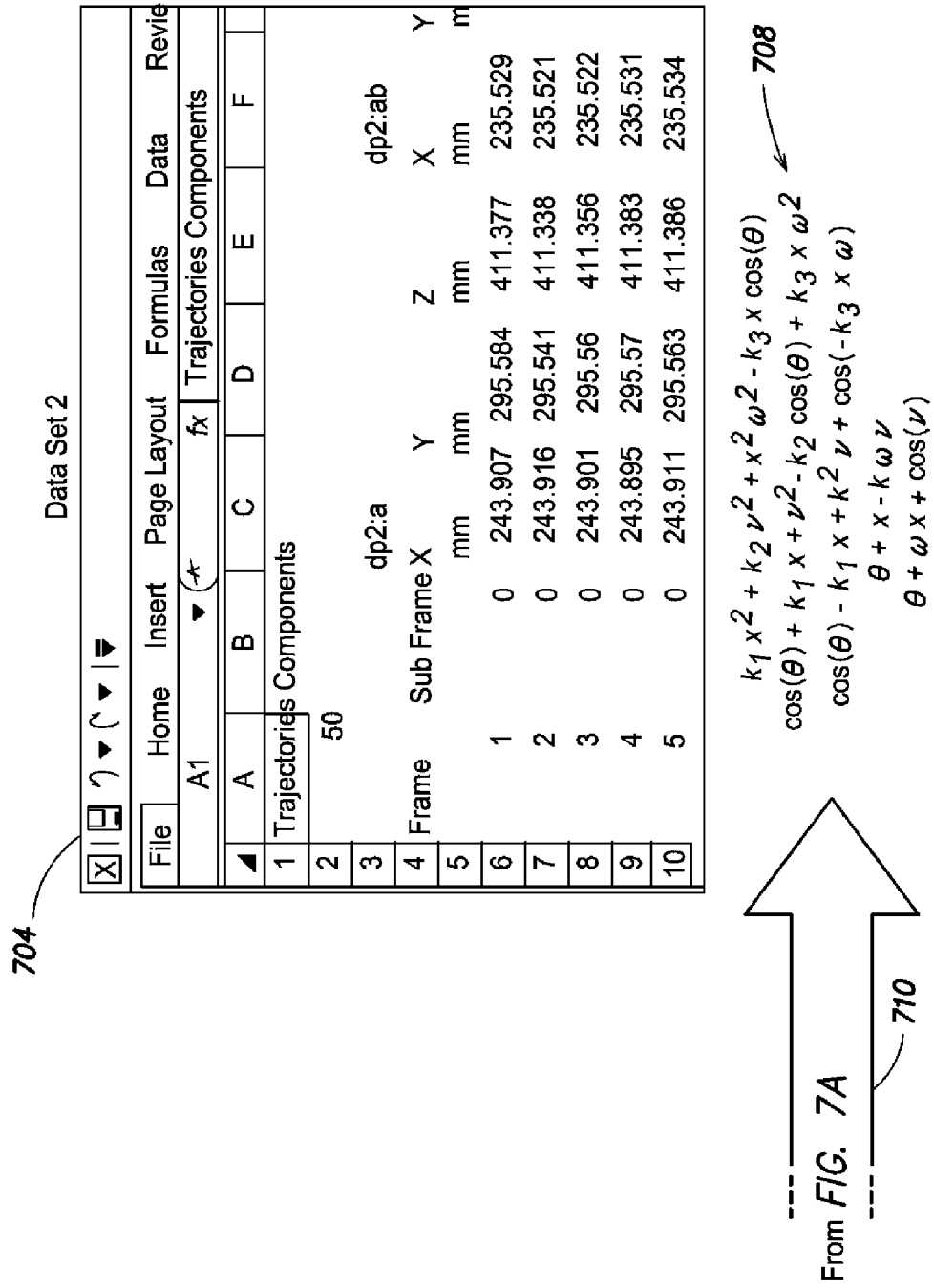

Shown in FIG. 7, is an illustration of a conceptual approach executed by an SR system to identify related and/or similar data sets for an input data set. FIG. 7 illustrates high level operations executed by the SR system which effectively operates as a search engine for data sets, returning, in some examples, not only similar and/or related data models but also the reason why the results are related and/or similar. In one approach, an input data set 702 is compared to a known or stored data set 704. Known or stored data set 704 can be captured automatically by the SR system executing web crawling processes for identifying and capturing data models. Additional known or stored data set 704 can be an input from prior search. Similarities and/or relationships are determined by the SR system, not from the underlying data (e.g., 702 and 704) but rather from the representation of each set of data (e.g., data models 706 and 708). In some embodiments, responsive to generation of a data model the SR system can be configured to store the data model for later comparisons to other input data sets.

According to one embodiment, the SR system is configured to compare data models in pair-wise comparisons, determining a distance metric for the analyzed data models. Each of the data sets is evaluated based on their equation genomes. Each set of equations making up a data model can be understood as akin to a group of multiple genes that encode a complete system. Using the calculations of similarity and/or relatedness, the SR system can be configured to generate topographical maps of similar/related data sets.

According to some embodiment, clustering processes can be executed using distance metrics generated between pairs of data models. In one example, clusters can be defined by putting similar (shortest distance from each other) data models into one cluster and pushing dissimilar data sets into other clusters. A topographical map of clusters can thus be generated by an SR system and displayed to an end user in a user interface. According to some embodiments, data model relationship can also be display in the user interface. In one example, the SR system defines nodes in a topographical, wherein each node is representative of a data model. Each edge in the map identifies a connection between the two nodes. The edges is generated by the SR system to represent a value for the distance metric indicating how related and/or similar the connected nodes are. In one embodiment, the display length of the edges can be directly or proportionally associated with the distance metric determined between two data sets and graphically represented in the map.

Figure 8:
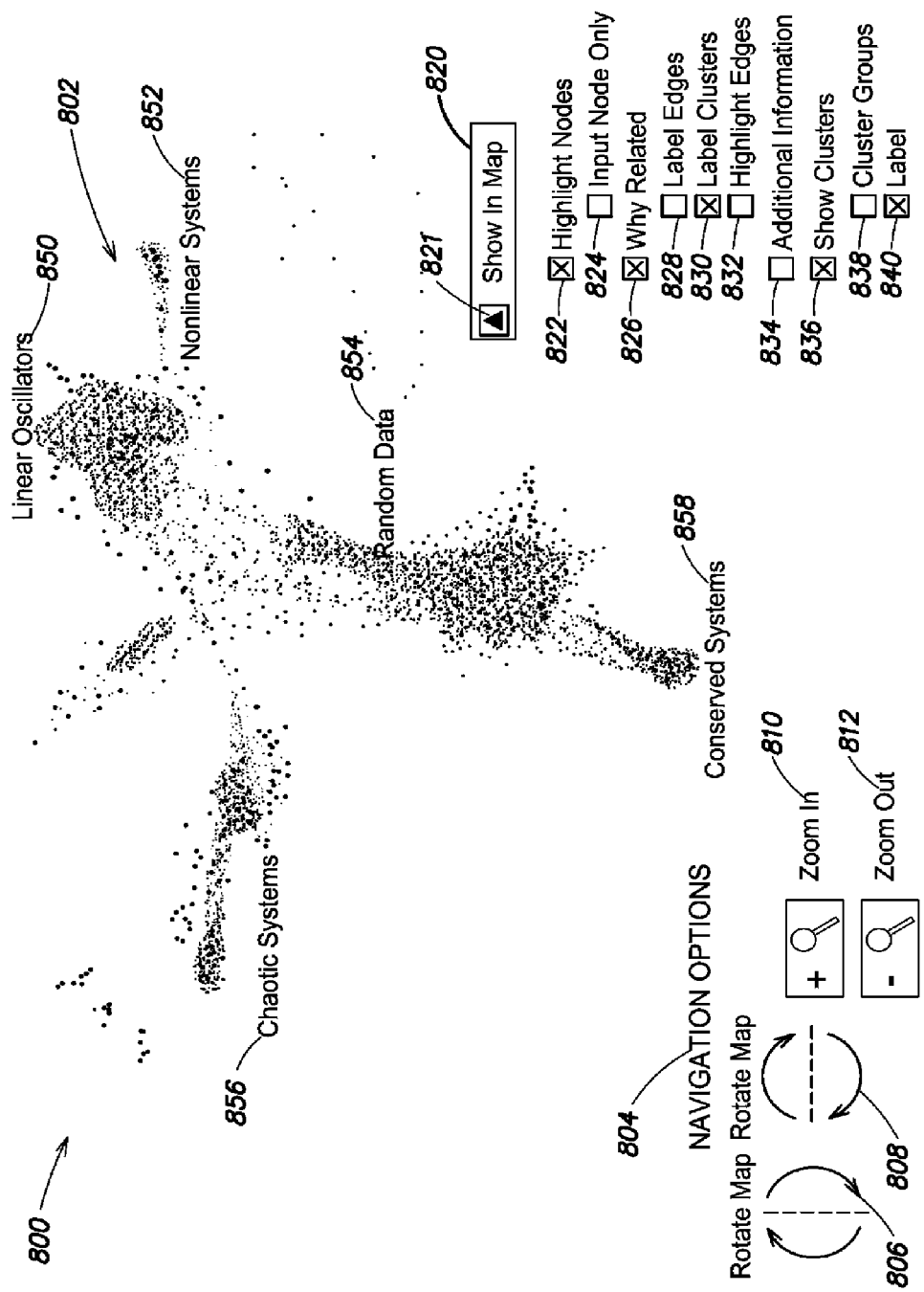
FIG. 8 is an example user interface rendering a topographical map of related data models, according to one embodiment.

Shown in FIG. 8 is an example user interface 800 displaying a topographical map 802. Within the topographical map data sets/data models are displayed as nodes. Each edge illustrated in the map shows a relationship and/or element of similarity. The dark spots (not labeled separately) correspond to the nodes, and the lines connecting the nodes (not labeled separately) correspond to the edges between nodes. The user interface can be configured to allow navigation within the topographical map. For example, the SR system can render a user interface 800 that is responsive to navigation selections within the user interface and/or navigation selections made with user input devices. Shown at 804, the system can be configured to render navigation operations that are available (e.g., 806—rotate around central pivot, 808—rotate around horizontal pivot, 810—zoom in, 812—zoom out). Selection in the user interface of the navigation displays can cause the system to perform the operation associated with the display.

Further, in some embodiments, the user interface and/or SR system can be responsive to hot keys or function keys that perform the navigation operations depicted in user interface 800 (e.g., 804). In addition, the user interface can also be responsive to click and drag operations responsive to a pointing device on an associated computer system. For example, the topographical map can be rotated through different viewing angles by dragging the map around display axes. Double clicking can zoom in, or select a node and/or edge to obtain additional detail on. In other examples, selecting a portion of the map using the pointing device (click and drag) can also be used to zoom into a selected portion of the map.

In further embodiments, an end user can customize the topographic map 802 by activating a Show in Map visual display element at 820. Show in map visual display can be configured to visualize selection options (e.g., 822-840) responsive to an expansion control. The expansion control can be configured to both expand and contract the options displayed in associated with the map 802. For example, at 821 shown is the expansion control after expanding the Show in Map options.

According to some embodiments, the shown in map options can enable an end user to customize the view of the topographical map that being visualized by the SR system. In particular, selection within 822 causes the SR system to highlight the node (which represents data models) in the topographical map. Selection of 824, causes the SR system to highlight only the input data model on which the user was searching. Highlighting can include changing color of the displayed node, changing size, blinking, etc. to make the respective visual element easier to visualize. At 826, the user interface displays a "Why Related Control." As discussed above, structural analysis of expression trees can include identification of why and/or how two data models are related to each other. The why and/or how can be displayed in the topographical map. According to one embodiment, label clusters at 830 can be enabled by default. Cluster labels can be generated by the SR system based on similarity between groups of data sets. Labels for any clusters can be automatically generated based on any information available about the data sets that make up each cluster, including for example, information on how or why the data models in the cluster are related. At 828, information about the data models being displayed can also include label edges. Each edge label can display the reason why two data models have a relationship (e.g., an equation linking the two models can be displayed, a label defining the linking equation can be displayed, among other options).

Other visualizations are available in the topographical map, including for example, highlight edges at 832. Highlighted edges may be limited to the nearest 10 results depending in some examples, on the scope of the visualized topographical map. Responsive to selection of 832, highlighting of edge connected to a selected node can be displayed. In one example, the input node or the basis of the set of results is set as the default node on which to highlight connected edges. In further embodiments, a user can select different nodes in the map, which causes the SR system to highlight the rendering of the edges connected to the selected node and/or nodes.

In other embodiments, further visualizations can include an additional information overlay display responsive to selection of 834. The SR system can be configured to display additional information for a selected node or nodes within the topographical map (e.g., additional information can include representative equation, nearest relationships, type of data model, information score, etc.). In other embodiments, further visualizations generated by the SR system can include visualization of cluster boundaries, for example, responsive to selection of 838. Other cluster information can include display of cluster labels, for example, responsive to selection of 840. In some embodiments, multiple display options can have linked functionality (e.g., 830 and 840) such that selection or de-selection of one in the user interface causes selection or de-selection of the other in the user interface.

As shown in interface 800, cluster labels can include generic descriptions of the members of the cluster. For example, a majority or significant portion of a group of data models within a cluster can be related to functions describing linear oscillators. Various clustering methodologies can be executed by the SR system to define clusters using data model similarity metrics, and further, to automatically generate cluster labels from those data models and relationships. Shown in FIG. 8 are some example cluster labels: linear oscillators at 850; nonlinear systems at 852; random data at 854; chaotic systems at 856; and conserved systems at 858, among other examples. In other embodiments, specific equations or groups of equations used to analyze and generate data models can be associated with a property label (e.g., linear oscillator, nonlinear system, random data, conserved system, chaotic systems, etc.). Based on inclusion of one or more equations with property labels, data models can also be associated with the same property labels. In some embodiments, the property labels can be used during clustering processes to label cluster of data models.

Example Computer Implementations

Various aspects and functions described herein, in accord with aspects of the present invention, may be implemented as hardware, software, or a combination of hardware and software on one or more computer systems. In some examples, execution engines can be implemented as software executing on hardware of a computer system. In others, various software components may be executed on the hardware to perform specific functions. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions discussed may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 9:
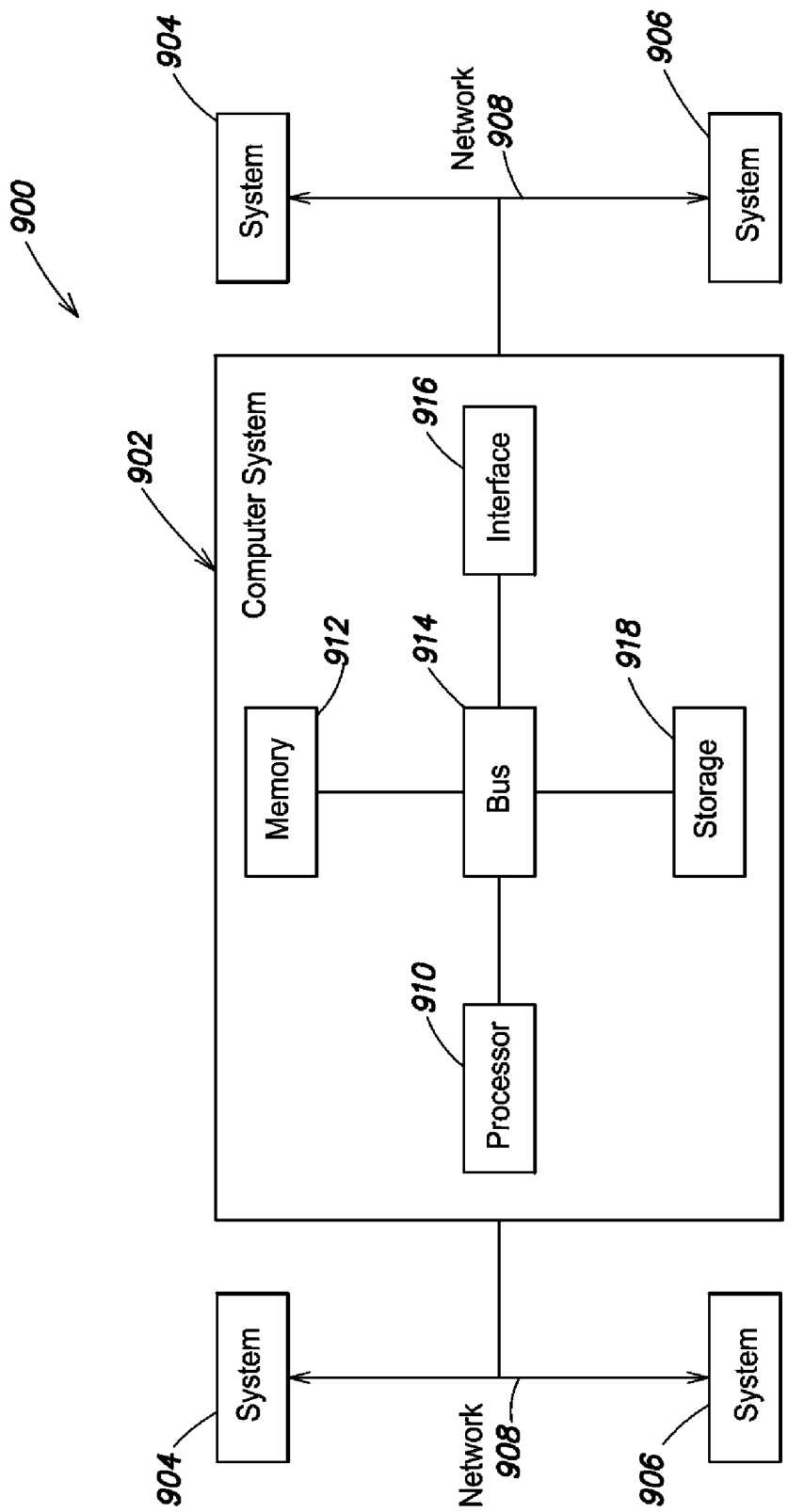
FIG. 9 is a block diagram of one example of a computer system that may be used to perform processes and functions disclosed herein.

FIG. 9 shows a block diagram of a distributed computer system 900, in which various aspects and functions in accord with the present invention may be practiced. The distributed computer system 900 may include one more computer systems. For example, as illustrated, the distributed computer system 900 includes three computer systems 902, 904 and 906. As shown, the computer systems 902, 904 and 906 are interconnected by, and may exchange data through, a communication network 908. The network 908 may include any communication network through which computer systems may exchange data. To exchange data via the network 908, the computer systems 902, 904, and 906 and the network 908 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 902, 904 and 906 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 904 and other computing devices in the network.

To ensure data transfer is secure, the computer systems 902, 904 and 906 may transmit data via the network 908 using a variety of security measures including TSL, SSL or VPN, among other security techniques. While the distributed computer system 900 illustrates three networked computer systems, the distributed computer system 900 may include any number of computer systems, networked using any medium and communication protocol.

Various aspects and functions in accord with the present invention may be implemented as specialized hardware or software executing in one or more computer systems including the computer system 902 shown in FIG. 9. As depicted, the computer system 902 includes a processor 910, a memory 912, a bus 914, an interface 916 and a storage system 918. The processor 910, which may include one or more microprocessors or other types of controllers, can perform a series of instructions that manipulate data. The processor 910 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 910 is connected to other system placements, including a memory 912, by the bus 914.

The memory 912 may be used for storing programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device, such as flash memory or phase-change memory (PCM). Various embodiments in accord with the present invention can organize the memory 912 into particularized and, in some cases, unique structures to perform the aspects and functions disclosed herein.

Components of the computer system 902 may be coupled by an interconnection element such as the bus 914. The bus 914 may include one or more physical busses (for example, busses between components that are integrated within a same machine), and may include any communication coupling between system placements including specialized or standard computing bus technologies such as IDE, SCSI, PCI and InfiniBand. Thus, the bus 914 enables communications (for example, data and instructions) to be exchanged between system components of the computer system 902.

Computer system 902 also includes one or more interfaces 916 such as input devices, output devices and combination input/output devices. The interface devices 916 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 916 allow the computer system 902 to exchange information and communicate with external entities, such as users and other systems.

Storage system 918 may include a computer-readable and computer-writeable nonvolatile storage medium in which instructions are stored that define a program to be executed by the processor. The storage system 918 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the storage system 918. The memory may be located in the storage system 918 or in the memory 912. The processor 910 may manipulate the data within the memory 912, and then copy the data to the medium associated with the storage system 918 after processing is completed. A variety of components may manage data movement between the medium and the memory 912, and the invention is not limited thereto.

Further, the invention is not limited to a particular memory system or storage system. Although the computer system 902 is shown by way of example as one type of computer system upon which various aspects and functions in accord with the present invention may be practiced, aspects of the invention are not limited to being implemented on the computer system, shown in FIG. 9. Various aspects and functions in accord with the present invention may be practiced on one or more computers having different architectures or components than that shown in FIG. 9. For instance, the computer system 902 may include speciallyprogrammed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 902 may include an operating system that manages at least a portion of the hardware placements included in computer system 902. A processor or controller, such as processor 910, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
receiving, in a user interface, a first data set having a plurality of data values associated with a plurality of variables;
generating, by a computer system, a first mathematical data model representing the first data set, the first mathematical data model comprising a first set of one or more equations, each equation in the first set of equations representing a relationship among variables in the plurality of variables;
comparing, by the computer system, the first mathematical data model to a plurality of mathematical data models, the plurality of mathematical data models including a second mathematical data model comprising a second set of one or more equations and associated with a second data set different from the first data set and a third mathematical data model comprising a third set of one or more equations and associated with a third data set different from the first data set;
determining, by the computer system, a similarity between the first mathematical data model and each of the plurality of mathematical data models to obtain a set of similarities including a first similarity and a second similarity, the determining comprising:
determining the first similarity between the first mathematical data model and the second mathematical data model; and
determining the second similarity between the first mathematical data model and the third mathematical data model; and
generating, by the computer system and based on the set of similarities, a result set of mathematical data models similar to the first mathematical data model, the result set of mathematical data models including the second mathematical data model and the third mathematical data model.

2. The method according to claim 1, further comprising:
organizing, by the computer system, the result set of mathematical data models based on an information score associated with each respective mathematical data model in the result set of mathematical data models.

3. The method according to claim 1, further comprising:
organizing, by the computer system, the result set into groups based on a type of data model associated with each mathematical data model in the result set of mathematical data models.

4. The method according to claim 3, further comprising:
ranking the groups based on a best information score of a respective member of a respective group of mathematical data models.

5. The method according to claim 4, further comprising:
ranking mathematical data models within the groups based on respective information scores.

6. The method according to claim 1, further comprising:
displaying the result set in the user interface.

7. The method according to claim 6, further comprising:
generating a display of the result set as a hierarchy of groups.

8. The method according to claim 7, wherein generating the display includes ordering the display of the hierarchy of groups based on a best information score associated with respective members of the hierarchy of groups.

9. The method according to claim 7, wherein generating the display of the result set includes ordering the display of mathematical data models within each group of the hierarchy based on a respective information score.

10. The method according to claim 1, wherein receiving, in the user interface, the first data set includes receiving the first data set as input provided into a display text box.

11. The method according to claim 1, wherein receiving, in the user interface, the first data set includes specifying a location of the first data set.

12. The method according to claim 11, further comprising:
uploading the first data set from the location.

13. The method according to claim 1, further comprising:
storing the result set of mathematical data models for subsequent comparison.

14. The method according to claim 1, further comprising:
generating a topographical map of nodes and edges connecting pairs of nodes, wherein the nodes represent the result set.

15. The method according to claim 14, wherein each of the nodes in the topographical map represents a respective mathematical data model in the result set.

16. The method according to claim 15, wherein a first edge in the topographical map represents a determined similarity between mathematical data sets represented by two nodes connected by the first edge.

17. The method according to claim 15, further comprising:
in response to receiving a selection of a node, displaying information about the mathematical data model represented by the node.

18. A computer system, comprising:
at least one processor configured to perform:
generating a user interface in response to execution of instructions, the user interface comprising:
a search input element configured to accept submission of a first multivariate data set; and
a search result display configured to display a result set of mathematical data models similar to a first mathematical data model, the result set of mathematical data models including a second mathematical data model comprising a second set of one or more equations and associated with a second data set different from the first multivariate data set and a third mathematical data model comprising a third set of one or more equations and associated with a third data set different from the first multivariate data set
generating the first mathematical data model representing the first multivariate data set, the first mathematical data model comprising a first set of one or more equations, each equation in the first set of equations representing a relationship among variables in the first multivariate data set
comparing the first mathematical data model to a plurality of mathematical data models, the plurality of mathematical data models including at least the second mathematical data model and the third mathematical model; and
determining a similarity between the first mathematical data model and each of the plurality of mathematical data models to obtain a set of similarities including a first similarity and a second similarity, the determining comprising:
determining the first similarity between the first mathematical data model and the second mathematical data model; and
determining the second similarity between the first mathematical data model and the third mathematical data model.

19. The computer system according to claim 18, wherein the user interface further comprises a graphical display configured to render nodes and edges in a topographical map, wherein each of the nodes represents a respective mathematical data model representing a respective multivariate data set.

20. The computer system according to claim 18, wherein the multivariate data set includes a plurality of numeric values associated with a plurality of variables.

21. The computer system according to claim 20, wherein at least some of the plurality of numeric values define the output of an equation including at least some of the plurality of variables.

22. A user interface generated by a computer system in response to execution of instructions on at least one processor of the computer system, the user interface comprising:
a search input element configured to accept submission of a first data set for use in generating a first mathematical data model representing the first data set, the first mathematical model comprising a first set of one or more equations, each equation in the first set of equations representing a relationship among variables in the first data set; and
a search result display configured to organize a result set of mathematical data models similar to the first mathematical model, the result set of mathematical models including a second mathematical data model comprising a second set of one or more equations and associated with a second data set different from the first data set and a third mathematical data model comprising a third set of one or more equations and associated with a third data set different from the first data set, the result set obtained by comparing the first mathematical data model to a plurality of mathematical data models including the first and second mathematical data models, the comparing comprising:
determining a first similarity between the first mathematical data model and the second mathematical data model; and
determining a second similarity between the first mathematical data model and the third mathematical data model.

23. A system comprising:
at least one processor configured to perform:
receiving a first data set having a plurality of data values associated with a plurality of variables;
generating a first mathematical data model representing the input first data set, the first mathematical data model comprising a first set of one or more equations, each equation in the first set of equations representing a relationship among variables in the plurality of variables;
comparing the first mathematical data model to a plurality of mathematical data models, the plurality of mathematical data models including a second mathematical data model comprising a second set of one or more equations and associated with a second data set different from the first data set and a third mathematical model comprising a third set of one or more equations and associated with a third data set different from the first data set;

determining a similarity between the first mathematical data model and the plurality of mathematical data models to obtain a set of similarities including a first similarity and a second similarity, the determining comprising:
- determining the first similarity between the first mathematical data model and the second mathematical data model; and
- determining the second similarity between the first mathematical data model and the third mathematical data model; and generating, based on the set of similarities, a result set of similar mathematical data models similar to the first mathematical data model, the result set of mathematical data models including the second mathematical data model and the third mathematical data model.

24. The system according to claim 23, wherein the at least one processor is further configured to organize the result set of mathematical data models based on an information score associated with each respective mathematical data model in the result set of mathematical data models.

25. The system according to claim 23, wherein the at least one processor is further configured to organize the result set into groups based on a type of data model associated with each mathematical data model in the result set of mathematical data models.

26. The system according to claim 25, wherein the at least one processor is further configured to rank the groups based on a best information score of a respective member of a respective group of mathematical data models.

27. The system according to claim 26, wherein the at least one processor is further configured to rank mathematical data models within the groups based on respective information scores.

28. The system according to claim 23, wherein the at least one processor is further configured to cause the result set to be displayed in a user interface.

29. The system according to claim 28, wherein the at least one processor is further configured to generate a display of the result set as a hierarchy of groups.

30. The system according to claim 29, wherein the at least one processor is further configured to order the display of the hierarchy of groups based on a best information score associated with respective members of the hierarchy of groups.

31. The system according to claim 29, wherein the at least one processor is further configured to order the display of data models within each group of the hierarchy based on a respective information score.

32. The system according to claim 23, wherein the at least one processor is further configured to receive information indicating a location of the first data set.

33. The system according to claim 32, wherein the at least one processor is further configured to upload the first data set from the location.

34. The system according to claim 23, wherein the at least one processor is further configured to generate a topographical map of nodes and edges connecting pairs of nodes, wherein the nodes represent the result set.

35. The system according to claim 34, wherein each of the nodes in the topographical map represents a respective mathematical data model in the result set.

36. The system according to claim 35, wherein a first edge in the topographical map represents a determined similarity between mathematical data sets represented by two nodes connected by the first edge.

37. The system according to claim 35, wherein the at least one processor is further configured to perform: in response to receiving a selection of a node, displaying information about the mathematical data model represented by the node.

38. The method according to claim 1, further comprising:
accepting additional search input options in the user interface.

39. The method according to claim 1, further comprising:
displaying, via the user interface, the result set of mathematical data models ranked by similarity to the first mathematical data model.

40. The method according to claim 1, wherein generating the result set includes evaluating one or more equations of the respective mathematical data models to determine similarity.

41. The method according to claim 40, wherein evaluating the one or more equations of the respective mathematical data models includes analyzing pairwise the one or more equations of the respective mathematical data models.

42. The method according to claim 40, further comprising:
visualizing, via the user interface, a solution fit plot including validation data points, training data points, and data size corresponding to the evaluated equations.

43. The method according to claim 42, further comprising:
executing training functions and validation functions against the first data set to generate the validation data points and the training data points.

44. The method according to claim 1, wherein generating the first mathematical data model representing the first data set comprises applying symbolic regression to the input data set.

* * * * *

UNITED STATES PATENT AND TRADEMARK OFFICE
CERTIFICATE OF CORRECTION

PATENT NO.        : 9,495,641 B2                    Page 1 of 1
APPLICATION NO.   : 14/016287
DATED             : November 15, 2016
INVENTOR(S)       : Michael Schmidt It is certified that error appears in the above-identified patent and that said Letters Patent is hereby corrected as shown below:

On the Title Page

In item (73) Assignee:
Please replace "Nutomian" with --Nutonian--

In the Claims

In Claim 23, Column 24, Line 54:
the input first data set, the first mathematical data Should read:
the first data set, the first mathematical data In Claim 23, Column 25, Line 13:
of similar mathematical data models similar to the Should read:
of mathematical data models similar to the Signed and Sealed this
Second Day of May, 2017

Michelle K. Lee
*Director of the United States Patent and Trademark Office*